US010365908B2

(12) United States Patent
Shepherd

(10) Patent No.: US 10,365,908 B2
(45) Date of Patent: Jul. 30, 2019

(54) SECURE REPROGRAMMING OF SMART DEVICES TO ALTER DEVICE FUNCTIONALITY BASED ON LICENSE RIGHTS

(71) Applicant: Flexera Software LLC, Itasca, IL (US)

(72) Inventor: Michael Gerrard Shepherd, Abingdon (GB)

(73) Assignee: Flexera Software LLC, Itasca, IL (US)

( * ) Notice: Subject to any disclaimer, the term of this patent is extended or adjusted under 35 U.S.C. 154(b) by 0 days.

(21) Appl. No.: 15/468,573

(22) Filed: Mar. 24, 2017

(65) Prior Publication Data

US 2018/0275979 A1 Sep. 27, 2018

(51) Int. Cl.

*G06F 8/61* (2018.01)
*G06F 21/10* (2013.01)
*G06F 21/57* (2013.01)
*H04L 9/32* (2006.01)

(52) U.S. Cl.

CPC .............. *G06F 8/61* (2013.01); *G06F 21/105* (2013.01); *G06F 21/572* (2013.01); *H04L 9/3247* (2013.01)

(58) Field of Classification Search

None

See application file for complete search history.

(56) References Cited

U.S. PATENT DOCUMENTS 6,976,163 B1 * 12/2005 Hind ..................... G06F 21/572 713/1
7,353,402 B2 * 4/2008 Bourne ................... G06F 21/10 713/180
9,043,896 B2 * 5/2015 Doyle ................... H04L 9/3268 726/15
9,086,917 B1 * 7/2015 Fitzgerald ................. G06F 8/60
9,177,152 B2 * 11/2015 Leclercq ............... G06F 21/575
9,195,806 B1 * 11/2015 Robinson ................ G06F 21/79
10,013,517 B1 * 7/2018 Zhou ..................... G06F 17/505
2002/0013898 A1 * 1/2002 Sudia ..................... G06Q 20/02 713/155

(Continued)

OTHER PUBLICATIONS

"Virtual Machines", Wikipedia, Mar. 16, 2016.*

*Primary Examiner* — Jaweed A Abbaszadeh
*Assistant Examiner* — Cheri L Harrington
(74) *Attorney, Agent, or Firm* — Knobbe Martens Olson & Bear LLP

(57) ABSTRACT

In programmable equipment where it is either undesirable or impractical to construct the program code with embedded licensing decision points, the program is constructed by hard-coding the license rights into the program code at program build time. License permissions are obtained from a sales order system and used to produce a code image, or select a pre-existing, pre-validated code image which contains only those features, facilities, or capabilities allowed by the applicable license rights for that particular sales order and on that particular programmable unit. Functionality of the device is updated as appropriate by use of a bootloader on the device for installation of a firmware image. In this way, the invention overcomes the technical limitations inherent in such devices by reprogramming the device to alter device functionality in keeping with rights and privileges added or deleted therefrom with regard to software installed thereon.

16 Claims, 3 Drawing Sheets

(56) References Cited

U.S. PATENT DOCUMENTS

Figure 1:
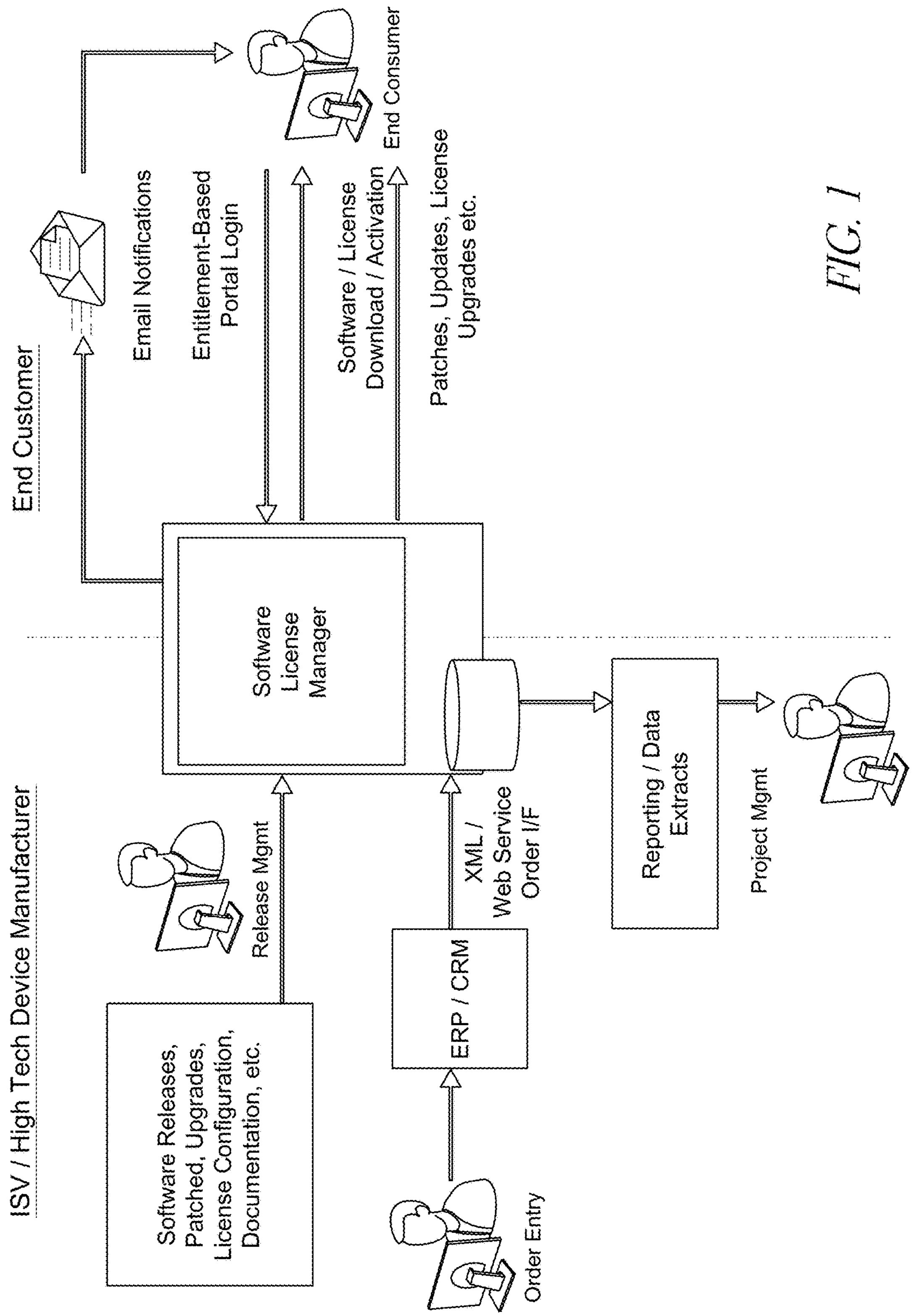

2004/0025155 A1* 2/2004 Sedlack .................... G06F 8/63 717/174
2004/0083379 A1* 4/2004 Neuman ............... G06F 21/575 713/193
2006/0280309 A1* 12/2006 Krishnaswamy ... H04L 63/0428 380/285
2008/0134176 A1* 6/2008 Fitzgerald ........... G06F 9/45537 718/1
2008/0134319 A1* 6/2008 Baker ..................... G06F 21/71 726/21
2008/0256349 A1* 10/2008 Dennis .................. G06F 21/121 713/1
2009/0249329 A1* 10/2009 Dash ......................... G06F 8/61 718/1
2010/0071069 A1* 3/2010 Sugiura ................. G06F 21/105 726/26
2010/0189260 A1* 7/2010 Ramanathan ........... G06F 21/10 380/259
2011/0067117 A1* 3/2011 Nagumo ............... G06F 21/105 726/30
2011/0317830 A1* 12/2011 Richardson ........ H04N 21/4334 380/201
2012/0036364 A1* 2/2012 Yoneda ..................... H04L 9/30 713/175
2012/0131578 A1* 5/2012 Ciano ................. G06F 9/45558 718/1
2013/0291060 A1* 10/2013 Moore ................ G06F 21/6245 726/1
2014/0082236 A1* 3/2014 Zhang ................... G06F 3/0601 710/74
2014/0298026 A1* 10/2014 Isozaki ................. H04L 9/0825 713/171
2014/0380502 A1* 12/2014 Sugiura ................. G06F 21/105 726/27
2016/0125187 A1* 5/2016 Oxford ................. G06F 21/575 713/2
2016/0162669 A1* 6/2016 Mikhailov ............. G06F 21/10 713/2
2016/0203302 A1* 7/2016 Huscroft ............... G06F 21/105 726/29
2017/0091458 A1* 3/2017 Gupta ..................... G06F 21/57
2017/0109532 A1* 4/2017 Zarakas ................ G06F 21/572
2017/0235928 A1* 8/2017 Desai .................... G06F 21/105 713/2
2017/0322815 A1* 11/2017 Buswell ................ G06F 9/4416
2018/0082046 A1* 3/2018 Bercow ................... G06F 21/31

* cited by examiner

SECURE REPROGRAMMING OF SMART DEVICES TO ALTER DEVICE FUNCTIONALITY BASED ON LICENSE RIGHTS

FIELD

The invention relates to smart devices. More particularly, the invention relates to the secure reprogramming of smart devices to alter device functionality based on license rights.

BACKGROUND

Conventional software licensing is implemented by the identification of decision points within a unit of control code, and when a decision point is arrived at by the execution unit, a decision is made as to which direction code execution should proceed, based on the presence or absence of a license right. This technique applies licensing at program execution time, and program code must be designed to obtain and store license permissions, and enforce program flow control based on the existence or absence of specific permissions.

Classes of programmable devices exist which do not lend themselves to conventional software licensing techniques. Such devices include smart devices, for example the types of devices that are regarded as contributing to the Internet of Things (IoT), i.e., the interconnection via the Internet of computing devices embedded in everyday objects, enabling them to send and receive data. “Things”, in the IoT sense, can refer to a wide variety of devices such as heart monitoring implants, biochip transponders on farm animals, electric clams in coastal waters, automobiles with built-in sensors, DNA analysis devices for environmental/food/pathogen monitoring, or field operation devices that assist firefighters in search and rescue operations. Current market examples include home automation (also known as smart home devices) such as the control and automation of lighting, heating (such as a smart thermostat), ventilation, air conditioning (HVAC) systems, and appliances such as washer/dryers, robotic vacuums, air purifiers, ovens, and refrigerators/freezers that use Wi-Fi for remote monitoring.

Such devices lack the resources of memory space and processor power which would otherwise allow them to tolerate the overhead of conventional software licensing technology, with its attendant requirements for executing cryptography algorithms.

SUMMARY

In those classes of programmable equipment where it is either undesirable or impractical to construct the program code with embedded licensing decision points, embodiments of the invention construct the program ahead of time, hard-coding the functionality attendant with the license rights into the program code at program build time, by only allowing features and modes of operation permissible by the applicable licensed permissions.

License permissions are obtained from a sales order system and used to produce a code image, or select a pre-existing, pre-validated code image which contains only those features, facilities, or capabilities allowed by the applicable license rights for that particular sales order and on that particular programmable unit. Functionality of the device, in keeping with current license right and privileges, is altered as appropriate by use of a bootloader on the device to reprogram the device with a firmware image comprising the most current licensed version of the software for the device.

In this way, the invention overcomes the technical limitations inherent in such devices by applying a novel technique for reprogramming the device to alter device functionality in keeping with rights and privileges added or deleted therefrom with regard to software installed thereon, where such rights and privileges affect operation of the device.

DRAWINGS

Figure 2:
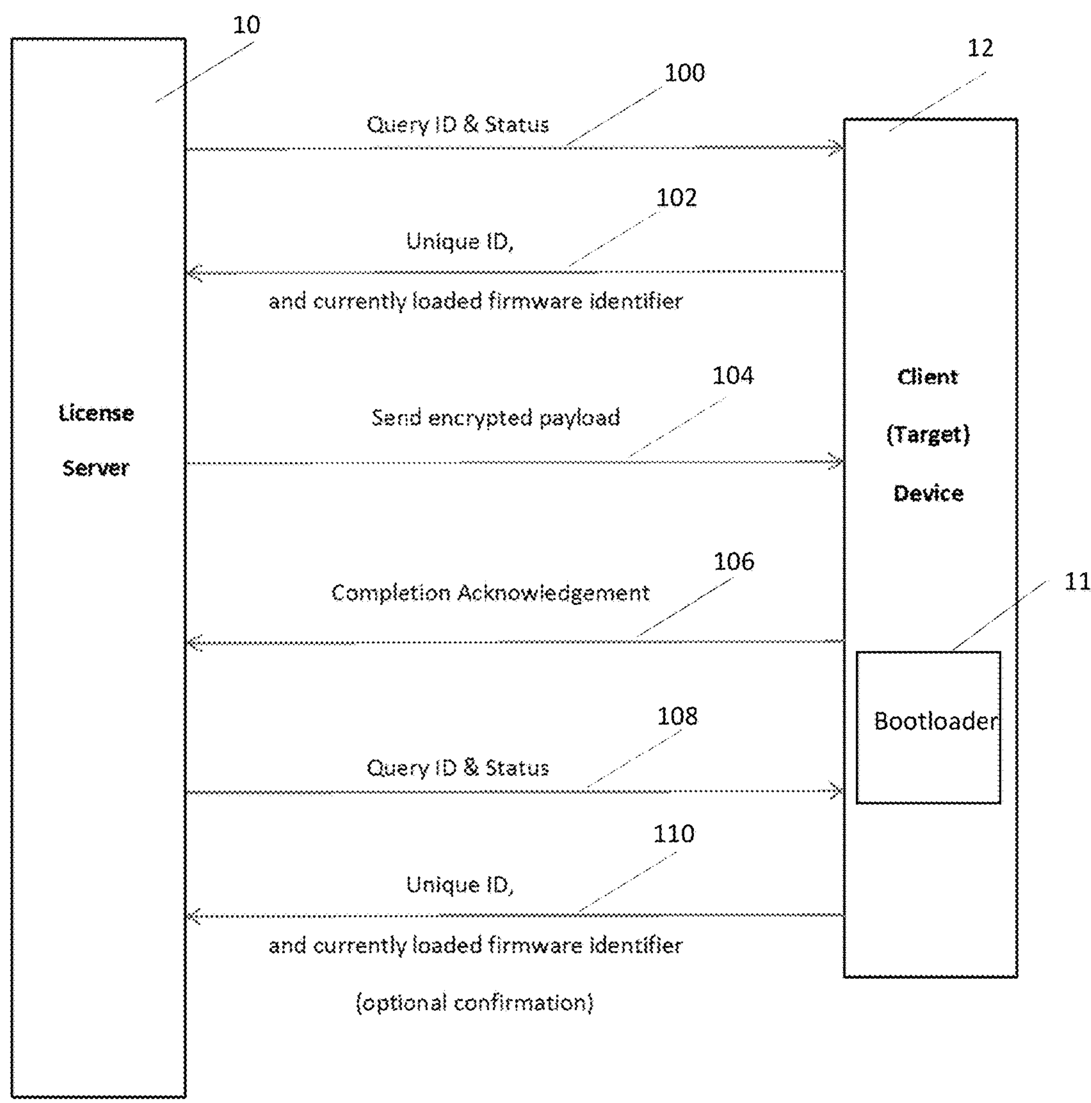
Figure 3:
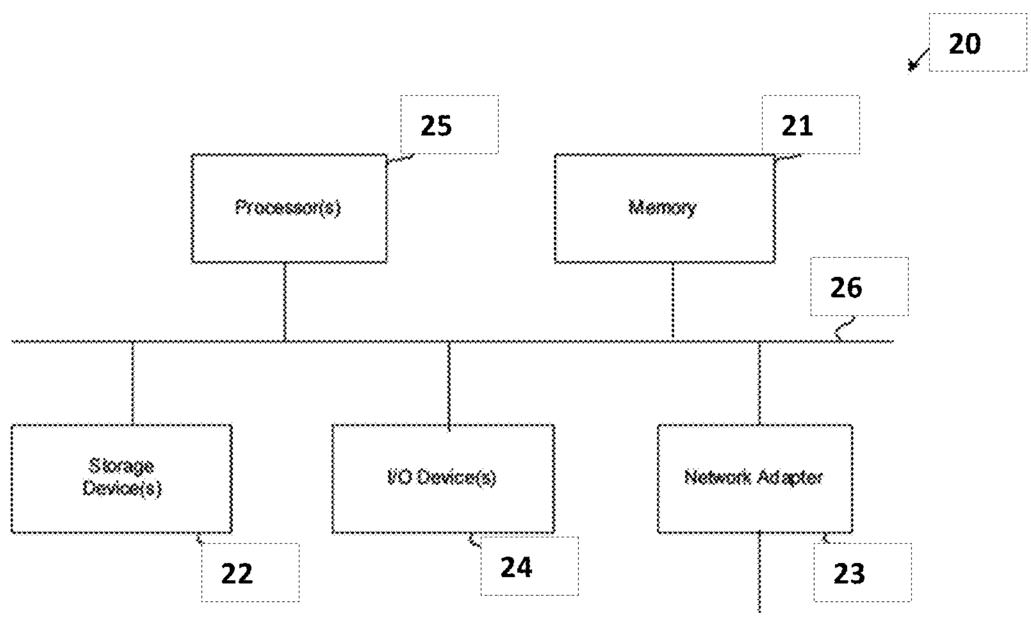

FIG. 1 is process flow diagram showing a typical software licensing process flow in a software license manager;

FIG. 2 is process flow diagram showing a typical download session to securely reprogram a target system with a code image containing altered device functionality pertaining to the license rights implied by a particular SKU according to the invention; and FIG. 3 is a block schematic diagram showing a machine in the example form of a computer system within which a set of instructions for causing the machine to perform one or more of the methodologies discussed herein may be executed.

DESCRIPTION

FIG. 1 is process flow diagram showing a typical software licensing process flow in a software license manager. A software license manager is a software management tool used by Independent software vendors or by end-user organizations to control where and how software products are able to run. License managers protect software vendors from losses due to software piracy and enable end-user organizations to comply with software license agreements. License managers enable software vendors to offer a wide range of usage-centric software licensing models, such as product activation, trial licenses, subscription licenses, feature-based licenses, and floating licensing from the same software package they provide to all users.

As noted above, conventional software licensing is implemented by the identification of decision points within a unit of control code, and when a decision point is arrived at by the execution unit, a decision is made as to which direction code execution should proceed, based on the presence or absence of a license right. This technique applies licensing at program execution time, and program code must be designed to obtain and store license permissions, and enforce program flow control based on the existence or absence of specific permissions.

In those classes of programmable equipment where it is either undesirable or impractical to construct the program code with embedded licensing decision points, embodiments of the invention construct the program ahead of time, hard-coding the device functionality permitted by the license rights into the program code at program build time, by only allowing features and modes of operation permissible by the applicable licensed permissions.

In embodiments of the invention, license permissions are obtained from a sales order system and used to produce a code image, or select a pre-existing, pre-validated code image which contains only those features, facilities, or capabilities allowed by the applicable license rights for that particular sales order and on that particular programmable unit. In embodiments of the invention, the code image is communicated to the device by any known communication mechanism, such as wired or wireless "Over The Air" (OTA) reprogramming, e.g., IEEE802.11 (Wi-Fi) derivatives, ZigBee, IEEE802.15 (Bluetooth), custom radio frequency communications in the unlicensed bands, e.g., 2 GHz, etc.

Functionality of the device, in keeping with current license right and privileges, is updated as appropriate by use of a bootloader on the device for installation of a firmware image comprising the device functionality implemented in accordance with the most current licensed version of the software for the device. In this way, the invention overcomes the technical limitations inherent in such devices by applying a novel technique for reprogramming the device to alter device functionality in keeping with rights and privileges added or deleted therefrom with regard to software installed thereon, where such rights and privileges affect operation of the device.

In embodiments of the invention, the licensing of functionality and features in a code base is achieved by restricting the flow of control through certain allowable sections of program code, by only providing those sections of code in the final build of the program code. License permissions are obtained from a sales order system and used to produce a code image, or select a pre-existing, pre-validated code image which contains only those features, facilities, or capabilities allowed by the applicable license rights for that particular sales order and on that particular programmable unit.

The programmable unit must be able to provide a means of uniquely identifying itself, and be capable of accepting and deciphering an update of executable code. Unique identity may be derived through leveraging a processor serial number burned into the device during manufacture, or more typically, storing at device manufacture time a Globally Unique Identification (GUID) value in protected, non-volatile storage within the device. The unique identification value would also be employed as part of a cryptographic key to allow deciphering of program code intended to be executed only on this particular device.

Unique identity and executable code interchange are handled by the bootloader program which is written into the device at the time of manufacture. Encryption of the identifier and decryption of the subsequent programmable code is performed by cryptography functions within the bootloader, using cryptographic keys written into the device at the time of manufacture, and protected from external inspection through the setting of memory access control fuses. These features are now common in bootloaders in most programmable devices considered suitable candidates for the herein disclosed invention, or in their absence, a custom bootloader can be written. The bootloader depends on the underlying hardware of the device, and whether a particular hardware manufacturer provides this feature. In some embodiments of the invention, the bootloader is specifically written for a device if a suitable version of the bootloader does not exist. The bootloader should be protected from modification, because it becomes the gatekeeper of what software may run on the device and, if modified as part of a security exploit, could assist in decrypting code generally for the device, as well as allowing non-official code to be loaded and executed on the device. Therefore, in embodiments of the invention, the bootloader should not be standard, but should be modified for the specific purpose of implementing the invention, if security is of paramount concern.

The back-office system links the unique identifier with a product SKU to record a licensing transaction. This allows the target device to be managed collectively with other devices that have their capabilities determined by traditional licensing techniques.

Verification of successful code reprogramming is achieved by the target system generating a cryptographic signature derived from the entire code block. This may be compared to an expected, matching value held in the back-office system. Thus, the bootloader in the device reads back the contents of the program code that has been sent to the device. A cryptographic signature is generated using the contents of the code memory being read back. If the back-office system and the bootloader in the device both possess the shared secret of how to generate this signature, the back office can compare its version of the signature with that created by the device, and they should be an exact match. This signature also allows the device to inform the back office at any future time as to which version of the executable code has been installed, because the signature may be used by the back office to infer this.

Subsequent communication with the bootloader may confirm the identity of a particular target device, plus the version of the currently loaded program code. Use of unique identification and encrypted program code transfer protects against unauthorized use on hardware-cloned, third-party devices.

FIG. 2 is a process flow diagram showing a typical download session to securely update the target system with the code image containing the appropriate functionality pertaining to the license rights implied by a particular SKU according to the invention. In FIG. 2, a license server 10 interacts with a client (target) device 12 via a bootloader 11. Communications between the license server and the client device may take place using any appropriate available mode, e.g., using wireless and/or wired technologies.

In an embodiment of the invention, the license server queries the client device for its ID and status (100). In embodiments of the invention, a communication protocol is pre-defined for a particular manufacturer and their own devices. A challenge-response dialog would establish that both ends could proceed with the communications, and that either party is enabled for such communication.

The client device responds with a unique ID and an identifier for its currently loaded firmware (102). In embodiments of the invention, this is pre-defined in the communication protocol defined for the device (or device class) and back office.

The license server sends an encrypted payload to the client device that includes a new code image containing additional features or entitlements, or that excludes features or entitlements that are no longer licensed to the client device as the case may be (104). In embodiments of the invention, decryption of the payload is performed by the bootloader, which knows how to decrypt the payload based on the pre-defined communication protocol.

The client device returns a completion acknowledgement after the new firmware is successfully installed (106). The license server then queries the client device for its ID and status to confirm that the newly downloaded firmware is installed and functioning properly (108). In embodiments of the invention, the bootloader is still running at this stage and control must not be passed to the newly downloaded and decrypted code until the back office is sure that the resultant payload is the correct version of the executable code. The device generates a cryptographic signature of the resultant, decrypted payload, and returns that to the back office for it to compare against a known, verification value.

In response, the client device returns its unique ID and a currently loaded firmware identifier (110). The software license manager keeps track of this, e.g., by implementation of a new requirement in the back office. Because the payload has been encrypted using unique identification data from the device it may only be decrypted, and subsequently executed, by that specific target device.

Client licensing models that are supported by embodiments of the invention include, for example:

Activation, initial installation: Securely update the target system with the code image containing the appropriate functionality pertaining to the license rights implied by a particular SKU.

Upgrades, extra features: Securely update the target system with the code image containing the extra features based on the license rights implied by a particular SKU. The back-office system may bill the customer for the upgrade, based on a verifiable, secure download, e.g., verifiable by securely obtaining a signature derived from the installed code image.

Returns, downgrade/remove features: Securely update the target system with a new code image that excludes the features or entitlements being returned. The back-office system may refund the customer for the return, based on a verifiable, secure download, e.g., verifiable by securely obtaining a signature derived from the installed code image.

Computer Implementation

FIG. 3 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 20 may include one or more central processing units ("processors") 25, memory 21, input/output devices 24, e.g., keyboard and pointing devices, touch devices, display devices, storage devices 22, e.g., disk drives, and network adapters 23, e.g., network interfaces, that are connected to an interconnect 26.

In FIG. 3, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a HyperTransport or industry standard architecture (ISA) bus, a small computer system interface (SCSI) bus, a universal serial bus (USB), IIC ($I^2C$) bus, or an Institute of Electrical and Electronics Engineers (IEEE) standard 1394 bus, also referred to as Firewire.

The memory 21 and storage devices 22 are computer-readable storage media that may store instructions that implement at least portions of the various embodiments of the invention. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media, e.g., non-transitory media, and computer-readable transmission media.

The instructions stored in memory 21 can be implemented as software and/or firmware to program one or more processors to carry out the actions described above. In some embodiments of the invention, such software or firmware may be initially provided to the processing system 20 by downloading it from a remote system through the computing system, e.g., via the network adapter 23.

The various embodiments of the invention introduced herein can be implemented by, for example, programmable circuitry, e.g., one or more microprocessors, programmed with software and/or firmware, entirely in special-purpose hardwired, i.e., non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A processor implemented method for secure reprogramming of programmable devices to alter device functionality, comprising:

obtaining license permissions for a target physical programmable device from a back-office system;

hard-coding a functionality of the target physical programmable device based on the license permissions into program code at program build time to restrict a flow of control through certain allowable sections of the program code, without requiring verification of the license permissions at a decision point during execution of the program code at the target physical programmable device, by only providing those sections of code in a final build of the program code, wherein only features, facilities, or capabilities allowed by the license permissions are implemented;

producing a firmware image from the program code, or selecting a pre-existing, pre-validated firmware image of the program code, which contains only the features, facilities, or capabilities allowed by the license permissions obtained from the back-office system and only for use on the target physical programmable device;

encrypting the firmware image; and delivering the firmware image to the target physical programmable device;

with a bootloader on the target physical programmable device:

the target physical programmable device uniquely identifying itself;

the target physical programmable device decrypting the firmware image; and the target physical programmable device installing the firmware image thereon to alter the functionality of the target physical programmable device to be consistent with the license permissions.

2. The method of claim 1, further comprising:

the target physical programmable device using cryptography functions within the bootloader to decrypt the firmware image.

3. The method of claim 2, further comprising:

the cryptography functions using cryptographic keys written into the target physical programmable device at a time of manufacture of the target physical programmable device.

4. The method of claim 1, further comprising:

setting memory access control fuses on the target physical programmable device to prevent external inspection of the target physical programmable device.

5. The method of claim 1, further comprising:

the back-office system linking a unique identifier of the target physical programmable device with a product SKU to record a licensing transaction.

6. The method of claim 1, further comprising:

at the target physical programmable device, generating a cryptographic signature derived from the firmware image; and comparing the generated cryptographic signature to an expected, matching value held in the back-office system to verify successful reprogramming of the target physical programmable device.

7. The method of claim 1, further comprising:

the back-office system communicating with the bootloader to confirm the identity of the target physical programmable device and a version of a currently loaded firmware image on the programmable device to protect against unauthorized use on hardware-cloned, third-party devices.

8. A processor implemented method, comprising:

a license server interacting with a target physical programmable device via a bootloader on said target physical programmable device in which:

the license server queries the target physical programmable device for a unique ID and status;

the license server receives from the target physical programmable device the unique ID and an identifier for currently installed firmware on the target physical programmable device;

the license server sends an encrypted payload to the target physical programmable device that includes a replacement firmware image, the replacement firmware image including program code for hard-coding a functionality of the target physical programmable device based on license permissions associated with a particular SKU for the target physical programmable device, the program code generated at build time to restrict a flow of control through certain allowable sections of the program code, without requiring verification of the license permissions when executing the program code at the target physical programmable device, by only providing those sections of code in a final build of the program code;

the license server receives from the target physical programmable device a completion acknowledgement after the replacement firmware image is successfully installed on the target physical programmable device;

the license server queries the target physical programmable device for the unique ID and status to confirm that the replacement firmware image is installed and functioning properly; and the license server receives from the target physical programmable device the unique ID of the target physical programmable device and a currently loaded firmware identifier;

wherein said target physical programmable device is securely reprogrammed with the replacement firmware image to implement the functionality at the target physical programmable device that is consistent with the license permissions associated with the particular SKU of the target physical programmable device.

9. A physical programmable device comprising:

a processor; and a memory communicatively coupled to the processor, the memory including:

a bootloader; and instructions executable by the processor to:

receive a query from a license server, the license server managing license permissions for the physical programmable device;

transmit, to the license server, in response to the query, a unique device identifier and a firmware identifier, the firmware identifier indicative of a firmware currently loaded at the physical programmable device;

receive, from the license server, a replacement firmware image, the replacement firmware image including program code for hard-coding a functionality at the physical programmable device based on the license permissions for the programmable device, the program code generated at build time to restrict a flow of control through certain allowable sections of the program code, without requiring verification of the license permissions when executing the program code at the physical programmable device, by only providing those sections of code in a final build of the program code, the replacement firmware image encrypted based on the unique device identifier such that the replacement firmware can only be decrypted and subsequently executed at the physical programmable device;

cause the bootloader to decrypt the received replacement firmware image based on a pre-defined communication protocol implemented by the bootloader and license server; and cause the bootloader to install the replacement firmware after decryption to securely reprogram the functionality of the physical programmable device to be consistent with the license permissions for the physical programmable device.

10. The physical programmable device of claim 9, wherein the bootloader uses a cryptographic key to decrypt the received replacement firmware image, the cryptographic key written into the memory of physical programmable device at a time of manufacture of the physical programmable device.

11. The physical programmable device of claim 9, wherein the memory includes further instructions executable by the processor to further:

transmit, to the license server, a completion acknowledgement after the replacement firmware image is successfully decrypted and installed by the bootloader.

12. The physical programmable device of claim 9, wherein the memory includes further instructions executable by the processor to further:

cause the bootloader to generate a cryptographic signature derived based on the decryption of the replacement firmware image; and transmit, to the license server, the generated cryptographic signature for comparison against a known verification value held in a back-office system communicatively coupled to the license server.

13. The physical programmable device of claim 12, wherein the memory includes further instructions executable by the processor to further:

receive, from the license server, a verification acknowledgment that the cryptographic signature matches the known verification value;

wherein reprogramming of the functionality of the physical programmable device by the bootloader occurs after receiving the verification acknowledgment from the license server.

14. The programmable device of claim 9, wherein the replacement firmware image includes program code that:

removes functionality that is hard-coded by the firmware currently loaded at the physical programmable device and that is not included in the license permissions for the physical programmable device; and/or adds functionality that is not hard-coded by the firmware currently loaded at the physical programmable device and that is included in the license permissions for the physical programmable device.

15. The physical programmable device of claim 9, further comprising:

a memory access control fuse configured to prevent external inspection of the physical programmable device.

16. The physical programmable device of claim 9, wherein the license permissions are associated, by the license server, with the programmable device based on a particular SKU for the physical programmable device.

* * * * *